(12) United States Patent
Zimmerling

(10) Patent No.: US 7,190,247 B2
(45) Date of Patent: Mar. 13, 2007

(54) SYSTEM AND METHOD FOR REDUCING EFFECT OF MAGNETIC FIELDS ON A MAGNETIC TRANSDUCER

(75) Inventor: Martin Zimmerling, Innsbruck (AT)

(73) Assignee: MED-EL Elektromedizinische Geraete GmbH, Innsbruck (AT)

( * ) Notice: Subject to any disclaimer, the term of this patent is extended or adjusted under 35 U.S.C. 154(b) by 205 days.

(21) Appl. No.: 10/877,510

(22) Filed: Jun. 25, 2004

(65) Prior Publication Data

US 2005/0001703 A1   Jan. 6, 2005

Related U.S. Application Data

(63) Continuation-in-part of application No. 10/405,093, filed on Apr. 1, 2003, now Pat. No. 6,838,963.

(60) Provisional application No. 60/482,687, filed on Jun. 26, 2003, provisional application No. 60/387,455, filed on Jun. 10, 2002, provisional application No. 60/369,208, filed on Apr. 1, 2002.

(51) Int. Cl.
  *H01H 9/00*   (2006.01)
(52) U.S. Cl. .................. 335/205; 335/207; 73/570; 73/576; 73/649; 73/652; 600/25; 600/55; 600/57
(58) Field of Classification Search ......... 73/488–551, 73/570–672; 335/205–207, 306; 600/25; 607/55–57
See application file for complete search history.

(56) References Cited

U.S. PATENT DOCUMENTS

| 3,987,967 | A | * | 10/1976 | Kuznetsov et al. | ............. | 241/1 |
|---|---|---|---|---|---|---|
| 4,257,936 | A | * | 3/1981 | Matsumoto et al. | ......... | 524/413 |
| 4,628,907 | A | | 12/1986 | Epley | .......... | 128/1.6 |
| 5,877,664 | A | | 3/1999 | Jackson, Jr. | .......... | 335/205 |
| 6,178,079 | B1 | | 1/2001 | Renger | ........... | 361/118 |
| 6,178,353 | B1 | | 1/2001 | Griffith et al. | .......... | 607/61 |
| 6,190,305 | B1 | | 2/2001 | Ball et al. | .......... | 600/25 |
| 6,217,508 | B1 | | 4/2001 | Ball et al. | .......... | 600/25 |
| 6,292,678 | B1 | * | 9/2001 | Hall et al. | .......... | 600/374 |
| 6,313,551 | B1 | | 11/2001 | Hazelton | .......... | 310/12 |
| 6,348,070 | B1 | | 2/2002 | Teissi et al. | .......... | 623/11.11 |

(Continued)

FOREIGN PATENT DOCUMENTS

WO   WO 97/32629   9/1997

(Continued)

OTHER PUBLICATIONS

International Search Reported Dated Dec. 20, 2004.

(Continued)

*Primary Examiner*—Ramon M. Barrera
(74) *Attorney, Agent, or Firm*—Bromberg & Sunstein LLP

(57) ABSTRACT

An electromagnetic driver transducer free of torque in the presence of an external magnetic field, of any direction and orientation (such as in a Magnetic Resonance Imaging environment). The transducer includes a housing. At least one coil is associated with the housing. A plurality of magnets within the housing are aligned along an axis in an anti-parallel orientation. The magnets are free to move along an axis, wherein vibration of the magnets causes vibration of the housing. The transducer may be, for example, fixed to an ossicle.

81 Claims, 8 Drawing Sheets

U.S. PATENT DOCUMENTS

| | | | |
|---|---|---|---|
| 6,358,281 B1 | 3/2002 | Berrang et al. | 623/10 |
| 6,505,062 B1* | 1/2003 | Ritter et al. | 600/407 |
| 6,506,987 B1 | 1/2003 | Woods | 200/61.62 |
| 6,522,909 B1* | 2/2003 | Garibaldi et al. | 600/424 |

FOREIGN PATENT DOCUMENTS

| WO | WO 03/092326 | 11/2003 |
|---|---|---|

OTHER PUBLICATIONS

Teissi et al, "Magnetic Resonance Image-Guided Proteomics of Human Glioblastoma Multiforme", Journal of Magnetic Resonance Imaging, Jan. 1999, vol. 9, No. 1, pp. 26-38, XP-001154780.

International Search Report of Nov. 12, 2003.

* cited by examiner

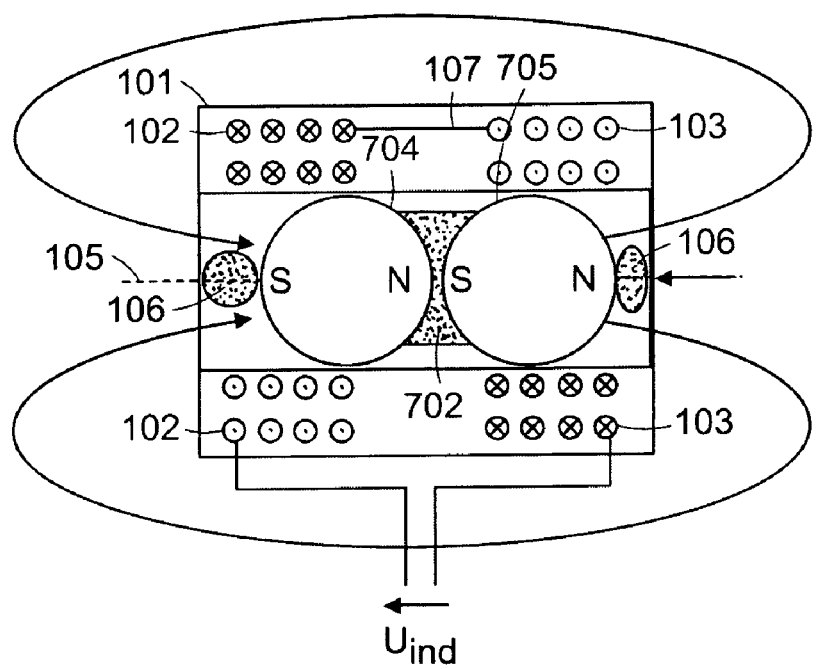
$\vec{B}_{ext}$ 1001
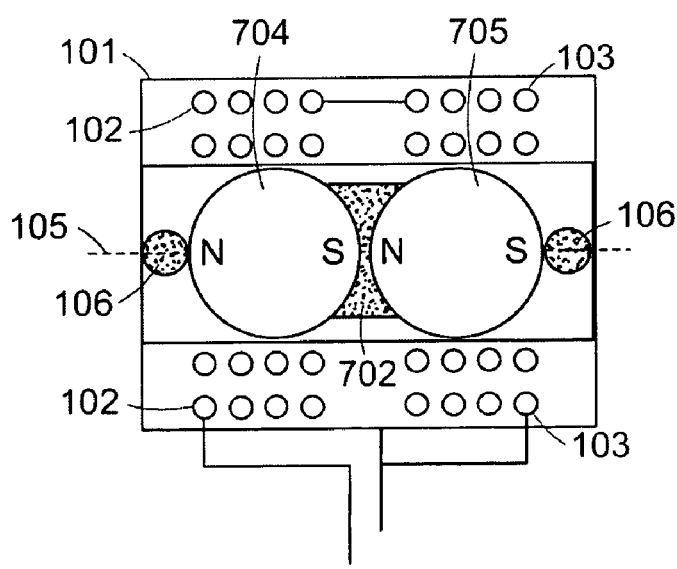
FIG. 10

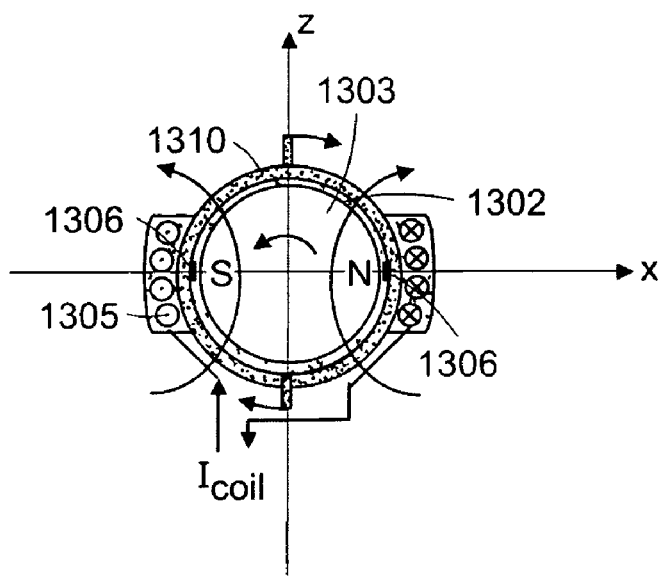
FIG. 13
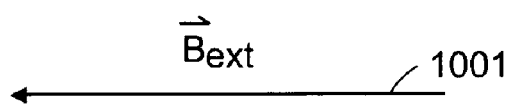
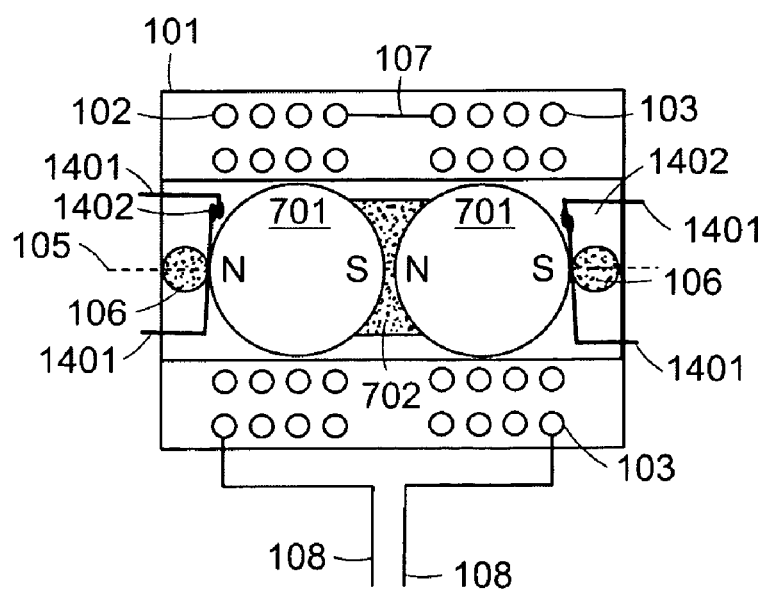
FIG. 14

SYSTEM AND METHOD FOR REDUCING EFFECT OF MAGNETIC FIELDS ON A MAGNETIC TRANSDUCER

CROSS REFERENCE TO RELATED APPLICATIONS

The present application claims priority from U.S. provisional application Ser. No. 60/482,687, entitled "Reducing Effect of Magnetic Fields on a Magnetic Transducer," filed Jun. 26, 2003. This application is also a continuation-in-part of U.S. patent application Ser. No. 10/405,093, filed Apr. 1, 2003, now U.S. Pat. No. 6,838,963, entitled "Reducing Effects of Magnetic and Electromagnetic Fields on an Implant's Magnet And/Or Electronics," which claims priority from U.S. provisional application Ser. No. 60/369,208, filed Apr. 1, 2002 and from U.S. provisional application No. 60/387,455, filed Jun. 10, 2002. Each of the above-mentioned applications is hereby incorporated herein by reference.

TECHNICAL FIELD

The present invention relates to transducers and external magnetic fields, and more particularly to an apparatus and method for reducing the effect of external magnetic fields on an electromagnetic transducer which may be positioned, for example, within an implant.

BACKGROUND ART

Implants often include various electromagnetic transducers that may function as an actuator, a sensor, and/or a switch. An example of an implant with an electromagnetic actuator is a middle ear implant which mechanically drives the ossicular chain. Such a middle ear implant that includes a floating mass transducer was developed by Geoffrey Ball et al., and is shown in FIG. 1 (see U.S. Pat. Nos. 5,913,815; 5,897,486; 5,624,376; 5,554,096; 5,456,654; 5,800,336; 5,857,958; and 6,475,134, each of which is incorporated herein by reference).

As shown in FIG. 1, the floating mass transducer 100 includes a housing 101 and at least one coil 102 and 103 coupled to the housing 101. A magnet 104 disposed within the housing 101 is biased by biasing elements 106. The biasing elements 106 are used in defining a resonance frequency, and also reduce friction between the magnet 104 and the interior surface of the housing 101 that may cause distortion. Electrical signals through the at least one coil 102 and 103 cause the magnet 104 to vibrate relative to the housing 101 along an axis 105. The vibration of the magnet 104 causes inertial vibration of the housing 101, which consequently produces vibrations in the inner ear.

Implants may also include an electromagnetic sensor. Electro-magnetic sensors may be utilized, without limitation, in a microphone, such as a microphone used in converting the mechanical vibrations of an ossicle in the middle ear into an electrical signal. Another application of an electro-magnetic sensor may be to detect the stapedius reflex (a reflex in the middle ear typically elicited when exceeding the maximum comfortable loudness level). Other methods for detection of the stapedius reflex typically require a sophisticated surgical technique and special electrodes for recording the myo-electric evoked response, such as a hook electrode patented by Lenarz et al. (see for example, U.S. Pat. No. 6,208,882), or are inconvenient, such as stapedius reflex detection by external tymphanometers. FIG. 2 (prior art) depicts an electromagnetic sensor which in principle could be employed as a stapedius reflex sensor.

Upon a wearer of such an auditory (cochlear or middle ear) prosthesis having to undergo Magnetic Resonance Imaging (MRI) examination, interactions between the implanted electromagnetic transducer and the applied external MRI magnetic field may, at higher field strength (i.e. above about 1 Tesla), produce three potentially harmful effects:

1. The implanted magnet experiences a torque ($T = m \times B$) that may twist the electromagnetic transducer out of its position, thereby injuring the implant wearer and/or destroying the mechanical fixation, as shown in FIG. 3 (prior art).
2. Due to the external magnetic field, the implanted magnet becomes partly demagnetized and this may lead to damage or at least to a reduced power efficiency of the electromagnetic transducer after exposure to the MRI field.
3. Magnetic RF pulses (magnetic field $B_1$ in MRI) emitted by the MR unit can induce voltages in the coil(s) of the electro-magnetic transducer and this may destroy the transducer and/or may harm the patient.

Because of these risks it may be generally forbidden to undergo (at least high-field) MRI examination for patients with an implant with electromagnetic transducer. This may exclude the patient from certain important diagnosis methods.

SUMMARY OF THE INVENTION

In accordance with one aspect of the invention, an electromagnetic transducer includes a housing. At least one coil is associated with the housing. A plurality of magnets within the housing are aligned along an axis in an anti-parallel orientation. The magnets are free to move along an axis, wherein vibration of the magnets causes vibration of the housing.

In related embodiments of the invention, the magnets may be cylindrical. The two magnets may be replaced by a single magnet with quadrupolar magnetization.

In accordance with another aspect of the invention, an electromagnetic transducer includes a housing. At least one coil is associated with the housing. A spherical magnet within the housing is capable of turning in any direction and of moving along an axis. A first keeper that includes magnetically soft material is free to move along the axis. The first keeper is attracted by a magnetic pole of the magnet in the absence of an external magnetic field, ensuring that opposing magnetic poles of the magnet are aligned parallel to the axis. An alternating current flowing through the at least one coil causes vibration of the magnet, which is transferred to the housing.

In related embodiments of the invention, a non-magnetic adapter may be free to move along the axis and holds the first keeper centered on the axis. The transducer may include a second keeper that includes magnetically soft material, the first and second keeper positioned on opposite sides of the magnet. The transducer may include a first non-magnetic adapter which is free to move along the axis and which holds the first keeper centered on the axis; and a second non-magnetic adapter which is free to move along the axis and which holds the second keeper centered on the axis, the first keeper and second keeper positioned on opposite sides of the magnet.

In accordance with another aspect of the invention, an electromagnetic transducer includes a housing and at least one coil. A plurality of spherical magnets within the housing. The magnets are capable of turning in any direction and of movement along an axis. Vibration of the magnets causes vibration of the housing.

In accordance with related embodiments of the invention, the plurality of spherical magnets include a first and second magnet. A non-magnetic adapter may placed between each of the magnets, each adapter free to move along the axis. The non-magnetic adapter may be one of a ball bearing and a slide bearing. A switching function that depends on the orientation of the external magnetic field may be implemented (in various embodiments, the spherical magnets attract unless the external magnetic field is perpendicular to the device's symmetry axis).

In embodiments related to the above-described embodiments, at least one biasing member may be positioned between the magnet(s) and the housing, the biasing member for biasing movement of the magnet(s). The at least one biasing member may be flexible and resilient, and may include one of a spring and a silicone material. The at least one biasing member may prevent the magnet(s) from directly contacting the housing. When the transducer is acting as a driver, the vibrations of the magnet(s) may be transferred directly to a driver shaft instead of being transferred to the housing of the transducer by the biasing elastic element(s). Alternatively, when the transducer acts as a sensor, movement of the driver shaft may cause the magnet to move such that current flows through the at least one coil.

In accordance with another embodiment of the invention, a rotational mass transducer includes a housing. A coil is mounted onto the housing. A spherical magnet within the housing is free to turn into any direction. Two keepers, each including magnetically soft material, attract the poles of the spherical magnet and are attached into the housing so that the magnetic moment during absence of external magnetic fields is oriented perpendicular to the magnetic field generated by a current flow through the coil. An alternating current flow through the coil generates an alternating torque which is exerted to the sphere. The sphere cannot turn fast enough because of its moment of inertia, and this causes also a rotational vibration of the housing which may, for example, be exploited to drive an ossicle in the middle ear.

In related embodiments of the invention, the transducer may include only one keeper. The keepers may be replaced by other means defining the rest orientation of the spherical magnet.

In the above-described embodiments, the electromagnetic transducers may be adapted and used as a sensor, wherein, for example, a vibration in the housing causes vibration in the magnet(s) so as to cause a current in the at least one coil. Alternatively, or in addition to acting as a sensor, the transducer may be adapted and used to act as an actuator/driver, wherein, for example, alternating current flowing through the at least one coil causes vibration of the magnet(s), the vibration transferred to the housing.

In further embodiments related to the above-described embodiments, the magnet(s) and/or the inner wall of the housing may be coated with a material providing low friction, such as Teflon®. The friction of the magnet(s) may be reduced by lubricants. The housing may be hermetically sealed and may be adapted to be fixed to an ossicle. The at least one coil may be positioned within, or external to, the housing. The electro-magnetic transducer may include more than one external coil, wherein the induced voltage of the plurality of coils arising from an external RF field is zero. The electromagnetic transducer may include, for example, three external coils, wherein the coil in the middle of the housing is winded in different orientation than the two outer coils, and where the number of loops of the coil in the middle equals the sum of loops of the outer coils so that the total induced voltage arising from external magnetic RF fields (e.g. $B_1$ field in MRI) is zero.

In still further embodiments related to the above-described embodiments, the transducers may be safe against demagnetization and may not exert any torque in the presence of a (strong) external magnetic field, like those occurring in a Magnetic Resonance Imaging environment. In those electromagnetic transducers with spherical magnet(s) which can generate translational vibrations, the orientation of the magnetic moment of the spherical magnet(s) can be defined by applying a strong axial magnetic field of desired orientation, allowing one to program a phase shift of 0° or 180° between the current flow in the coil(s) and the resulting motion of the magnet(s) and vice versa.

Applications for the above-described transducers, which are free of torque and the risk of demagnetization in the presence of a strong magnetic field, shall not be limited to use in MRI environments and not limited to medical implants.

BRIEF DESCRIPTION OF THE DRAWINGS

The foregoing features of the invention will be more readily understood by reference to the following detailed description, taken with reference to the accompanying drawings, in which:

FIG. 9 schematically shows the embodiment of FIG. 7 acting as motion sensor, in accordance with one embodiment of the invention;

FIG. 10 schematically shows the embodiment of FIG. 7 when a strong external magnetic field (e.g. of an MR scanner) oriented anti-parallel to the magnetic moments of the spherical magnets is present, the spheres rotating by 180° to align their magnetic field with the external field, in accordance with one embodiment of the invention;

FIG. 13 schematically shows an electromagnetic transducer acting as a rotational mechanical stimulator, in accordance with one embodiment of the invention;

FIG. 14 schematically shows the electromagnetic transducer of FIG. 10 that additionally includes a switch that is in a closed position, in accordance with one embodiment of the invention.

DETAILED DESCRIPTION OF SPECIFIC EMBODIMENTS

In illustrative embodiments, an electromagnetic transducer is presented that advantageously reduces the effect of external magnetic fields. The transducer is generally free of torque in the presence of an external magnetic field of any direction and orientation. Moreover, in various embodiments, the transducer resists de-magnetization and is safe against induction of voltages arising from magnetic pulses that may occur, for example, during Magnetic Resonance Imaging (MRI).

Figure 1:
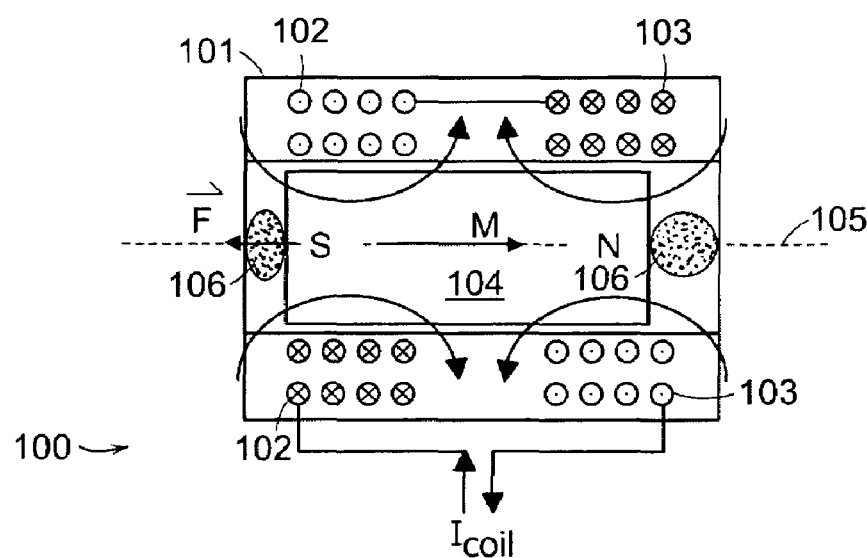
FIG. 1 schematically shows an electromagnetic transducer with differential coils and a cylindrical magnet acting as a mechanical stimulator, as employed in a middle ear implant, where a current flow in the coils results in a movement of the magnet which translates into a movement of the housing (PRIOR ART)
Figure 2:
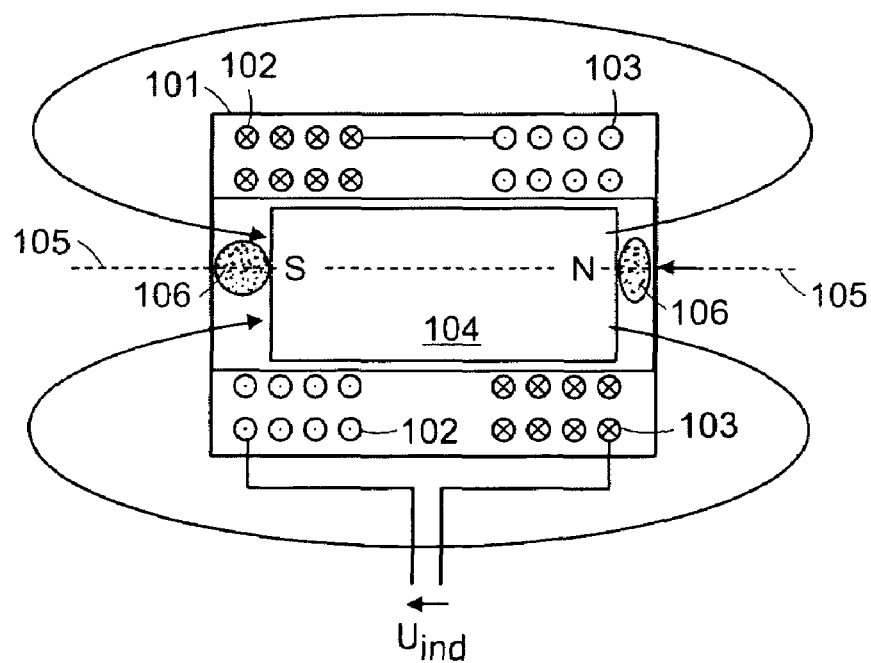
FIG. 2 schematically shows an electromagnetic transducer with differential coils and a cylindrical magnet acting as a mechanical sensor, where the movement of the housing translates into a movement of the magnet, resulting in an induction of voltages in the coils (PRIOR ART)
Figure 3:
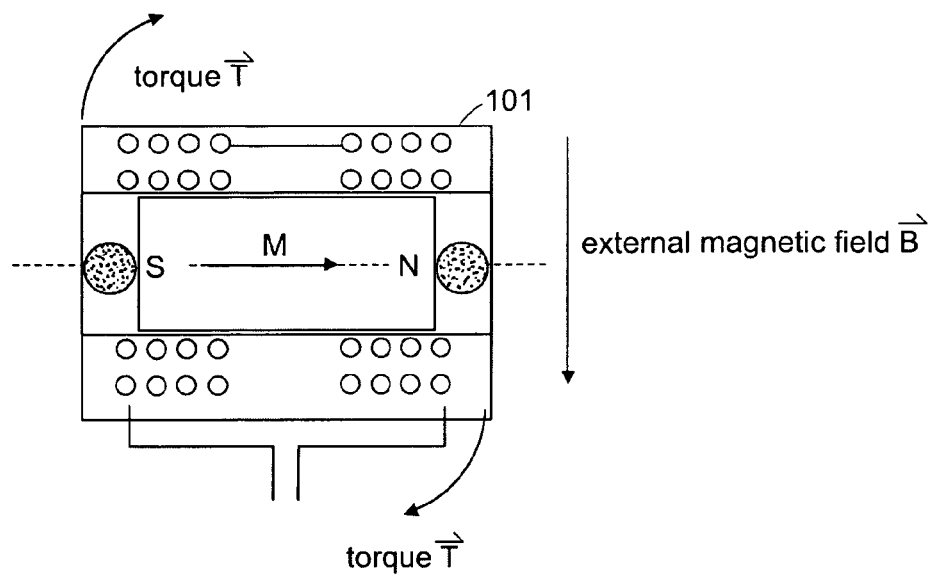
FIG. 3 schematically shows an electromagnetic transducer experiencing a torque as a result of an external magnetic field (e.g. in an MRI scanner) that is not parallel to the magnetic moment of the magnet of the transducer (PRIOR ART)
Figure 4:
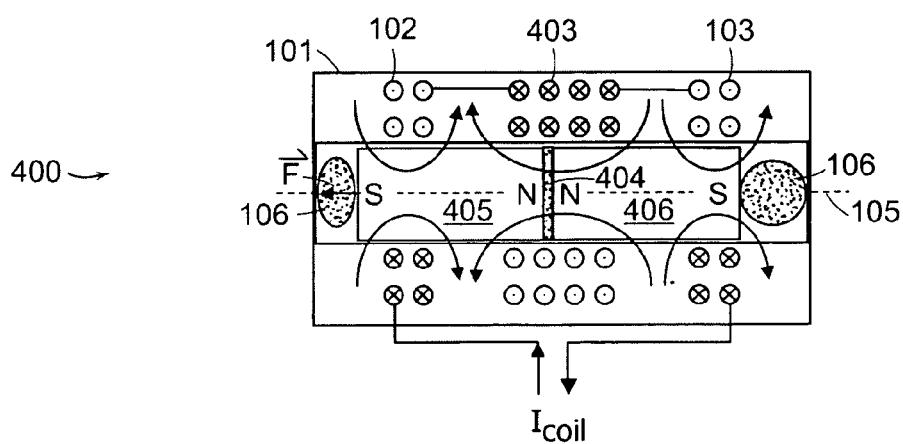
FIG. 4 schematically shows an electro-magnetic transducer acting as a mechanical stimulator, the transducer including two anti-parallel mounted cylindrical magnets and one or more coils, in accordance with one embodiment of the invention.

FIG. 4 shows a transducer 400 acting as a mechanical stimulator in accordance with one embodiment of the invention. As used in this description, and the accompanying claims, the term "transducer" as used herein shall mean a device that converts energy or information of one physical quantity into another physical quantity. A transducer may act as a sensor and/or a stimulator/driver, as known in the art.

The transducer 400 includes a housing 101, which in preferred embodiment is non-ferromagnetic. The housing may be hermetically sealed so as to prevent corrosion and/or leakage of material into or out of the housing. The housing may be made of a biocompatible material, particularly when the transducer is to be implanted. Material used for the housing may include, without limitation, stainless steel, titanium, iron, aluminum, platinum, nylon or a ceramic.

At least one coil 102, 103 and 403 is associated with the housing 101, and may be mounted externally or within the housing 101. For example, as shown in FIG. 4, the housing 101 may be associated with three coils 102, 103, and 403, with the middle coil 403 wound in a direction that is different from the other two coils 102 and 103.

At least two magnets 405 and 406, that may be, without limitation, substantially identical in terms of their magnetic moments and cylindrical in nature, are mounted back to back (for, example, with either their north poles or south poles adjacent) in an anti-parallel configuration along an axis 105 within the housing 401. Since the two magnets 405 and 406 have opposite magnetic moments, the total torque exerted to the arrangement in the presence of an external magnetic field of any orientation (e.g. in an MRI unit) is substantially zero.

Figure 5:
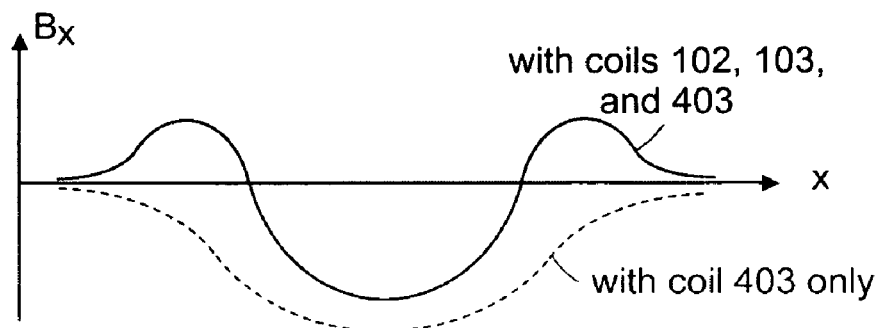
FIG. 5 is a chart illustrating the axial component of the magnetic field generated by a current flow through the coils (and, for comparison, for a current flow only through the inner coil) of the transducer depicted in FIG. 4, in accordance with one embodiment of the invention.

In various embodiments, a simplified arrangement with only one coil may be used. Such an arrangement may be less efficient since the force on the transducer magnets 405 and 406 is proportional to the local gradient of the magnetic field generated by the coil(s) 101, 102 and 403. FIG. 5 shows the axial distribution of the axial component of the magnetic field generated by one and three coils, in accordance with an embodiment of the invention.

Note that the embodiment shown in FIG. 4 works fine for external magnetic field strengths that cannot weaken one of the magnets 405 and 406. At even stronger external magnetic fields, the magnet that is oriented anti-parallel to the external magnetic field may be diminished. This leads to a residual net magnetization for the two magnets 405 and 406, thus resulting in a torque exerted to the two magnets 405 and 406.

In preferred embodiments, the coils 102, 103 and 403 may be arranged such that the net voltage induced from a magnetic RF pulse is substantially zero. For example, in the embodiment shown in FIG. 4, the added inductance of coils 102 and 103 can be chosen to be substantially identical to the inductance of coil 403. Consequently, the induced voltage from coils 102 and 103 will be substantially equal to, and compensate for, the induced voltage from coil 403. This results in the substantial elimination of residual signals produced when the system is exposed to a homogeneous electromagnetic field, such as from an MRI unit.

Figure 6:
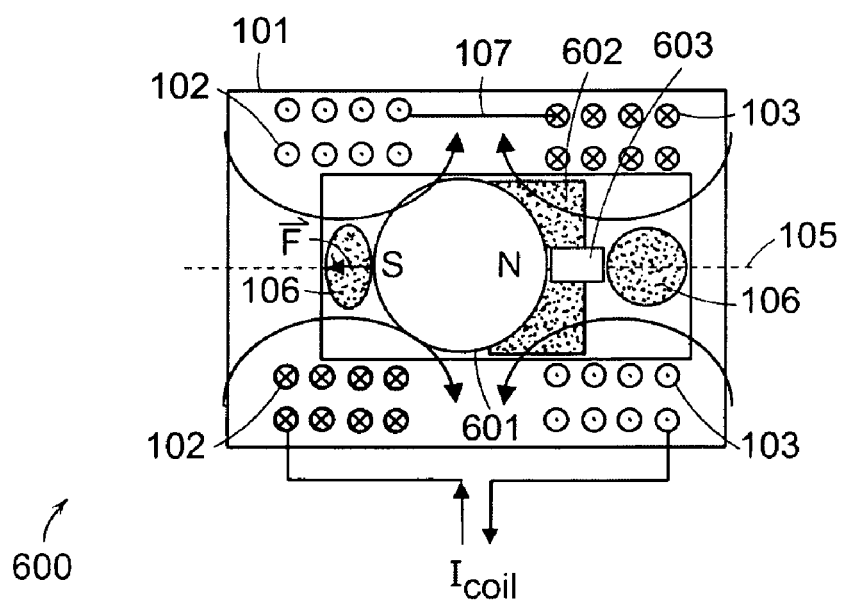
FIG. 6 schematically shows an electromagnetic transducer acting as a mechanical stimulator, that includes a spherical magnet and a keeper, in accordance with one embodiment of the invention.

FIG. 6 schematically shows a transducer 600 acting as a mechanical stimulator, in accordance with another embodiment of the invention. The transducer 600 includes a housing 101, which is preferably non-ferromagnetic, and which may be hermetically sealed and biocompatible, as described in above embodiments. The transducer 600 further includes a spherical magnet 601, a magnetically soft element 603 (referred to herein and in the claims as a keeper), and at least one coil 102 and 103.

The keeper 603 includes magnetically soft material that becomes magnetized in the direction of an external magnetic field. The keeper 603 may include, without limitation, a solid alloy, Ferrite, or Ferrofluid. When placed adjacent an external part that includes a magnet 601, the keeper 603 becomes magnetized and becomes attracted to the magnet 601, holding/keeping the magnet 601 in place, so that the magnet 601 is prevented from rattling.

The spherical magnet 601 is mechanically free to turn into any direction and to move along the transducer's axis 105 of rotational symmetry. In the absence of an external magnetic field, an attractive force between the keeper 603 (which is mechanically free to move along the transducer's axis 105 of rotational symmetry) and a magnetic pole of the spherical magnet 601 causes opposing magnetic poles of the magnet 601 to be aligned parallel to the transducer's axis 105 of rotational symmetry. Thus, the spherical magnet 601 can act like a standard cylindrical magnet in a state-of-the-art electromagnetic transducer. Without the keeper 603, the orientation of the magnetic moment of the spherical magnet 601 would be undefined, and this would lead to an undefined movement of the magnet 601 in the transducer 600. In alternative embodiments, the keeper 603 may be replaced by any other system or principle that keeps the magnetic moment of the spherical magnet parallel to the axis 105 of symmetry of the transducer 600.

In the presence of a strong external magnetic field, the magnetization of the keeper 603 aligns in the direction of the external magnetic field, while the spherical magnet 601 turns to align its magnetic momentum vector with the external magnetic field. Thus, the electromagnetic transducer 600 is free of torque and cannot be demagnetized in the presence of a strong external magnetic field of any direction and orientation, e.g. during Magnetic Resonance Imaging (MRI). In various embodiments, the two coils 102 and 103 are identical but are winded in opposite directions, ensuring the net voltage induced from a magnetic RF pulse is substantially zero.

Figure 7:
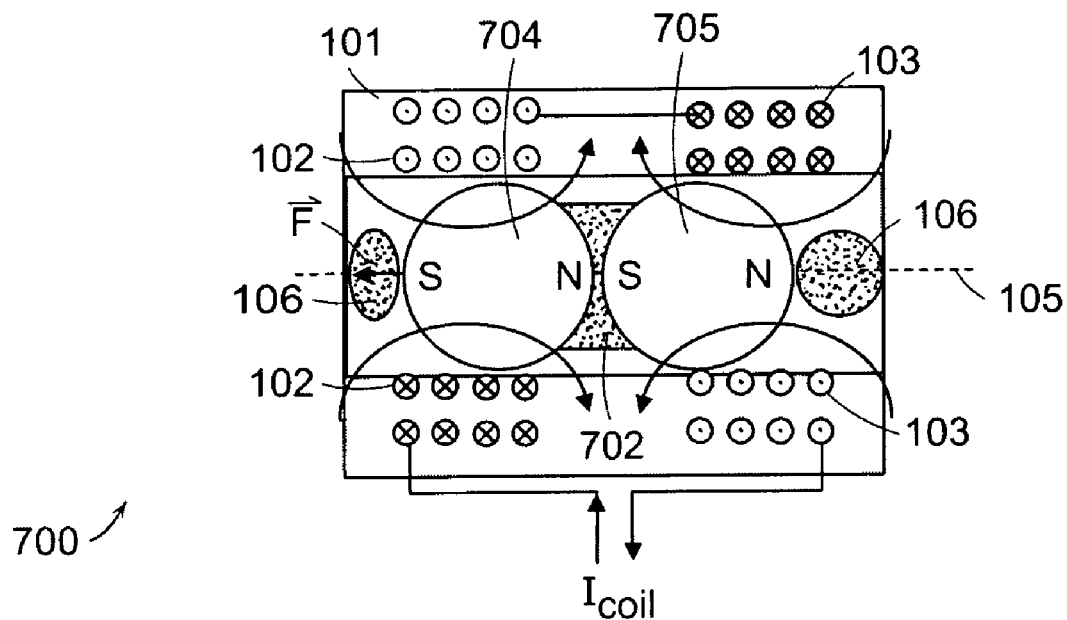
FIG. 7 schematically shows an electro-magnetic transducer acting as a mechanical stimulator, the transducer including two spherical magnets and a keeper, in accordance with one embodiment of the invention.
Figure 8:
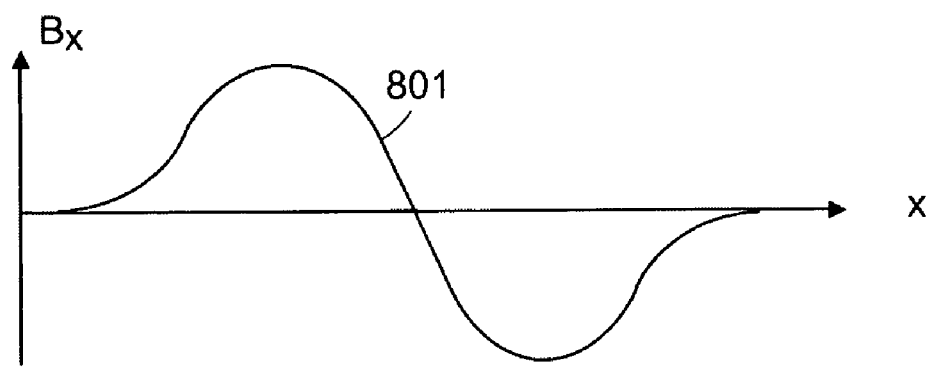
FIG. 8 is a chart illustrating the axial component of the magnetic field generated by a current flow through the coils of the transducer depicted in FIG. 7, in accordance with one embodiment of the invention.

In accordance with another embodiment of the invention, there is provided a transducer 700 acting as a mechanical stimulator that includes a housing 101 with at least two coils 102, 103 and at least two spherical magnets 704, 705, as shown in FIG. 7. The spherical magnets 704 and 705 are mechanically free to turn in any direction and to move along the device's axis 105 of rotational symmetry. The housing 101 may have a cylindrical arrangement and be non-ferromagnetic, similar to above described embodiments. The axial magnetic field distribution 801 generated by the coils is depicted in FIG. 8.

A non-magnetic adapter 702 with spherical calottes, preferably made of or coated by Teflon® or a similar material, may be placed between the two attracting spherical magnets 704 and 705 to reduce the punctual pressure and, when the spheres turn, the friction between the two spheres 704 and 705. Furthermore, the adapter 702 may include a material that reduces the reluctance between the magnets 704 and 705.

In the absence of any strong external magnetic field, the spherical magnets 704 and 705 are magnetically attracted together (the north pole of one magnet is attracted by the south pole of the other magnet) and form a stable magnetic moment with undefined orientation parallel to the axis 105 of symmetry. Since the attractive force between the spheres 704 and 705 is designed to be much stronger than the force resulting from the magnetic field generated by the coils 102, 103, the orientation of the magnetic moment of the magnets 704 and 705 can generally not be altered by a current in the coils 102, 103. The spherical magnets 704 and 705 thus act like a single standard (cylindrically shaped) magnet in a state-of-the-art electro-magnetic transducer, where the magnet can only move along its axis but cannot change its orientation.

Figure 11:
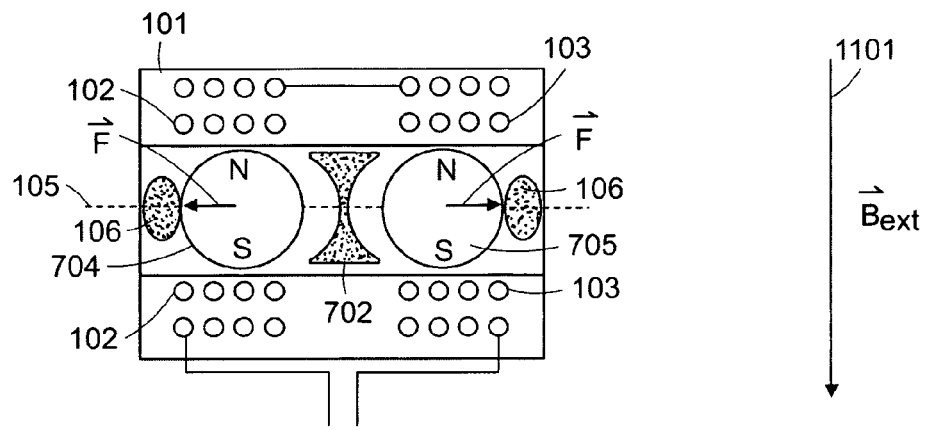
FIG. 11 schematically shows the embodiment of FIG. 7 when a strong external magnetic field (e.g. of an MR scanner) oriented perpendicular to the magnetic moments of the spherical magnets is present, the spheres rotating by 90° to align their magnetic field with the external field, with the spherical magnets repelling each other, in accordance with one embodiment of the invention.

When a strong external magnetic field of any direction and orientation is present, the spherical magnets 704 and 705 can align their magnetic moments with that external field. If the external field is orientated parallel to the device's axis 105 of symmetry and is facing into the same direction like the magnetic moments of the spherical magnets 704 and 705, the magnets 704 and 705 keep their orientation. In case of an anti-parallel external magnetic field 1001, the two spheres 704 and 705 (and the direction of their magnetic moment) flip by 180°, as shown in FIG. 10. The two spherical magnets 704 and 705 of the electromagnetic transducer act like a single magnet with reverse magnetic poles, causing a movement of the magnets 704 and 705 into the opposite direction. If an external magnetic field 1101 is oriented normal to the device's axis 105 of rotational symmetry, the spherical magnets 704 and 705, when aligning their magnetic moments parallel to the orientation of the external field, are repelling each other, but like for any orientation of the external magnetic field no torque is exerted to the magnets, and no (partial) demagnetization of the magnets 704 and 705 can occur, as shown in FIG. 11. Because the two coils 102 and 103 are identical but winded in different orientation, the net voltage induced from a magnetic RF pulse is zero.

Figure 15:
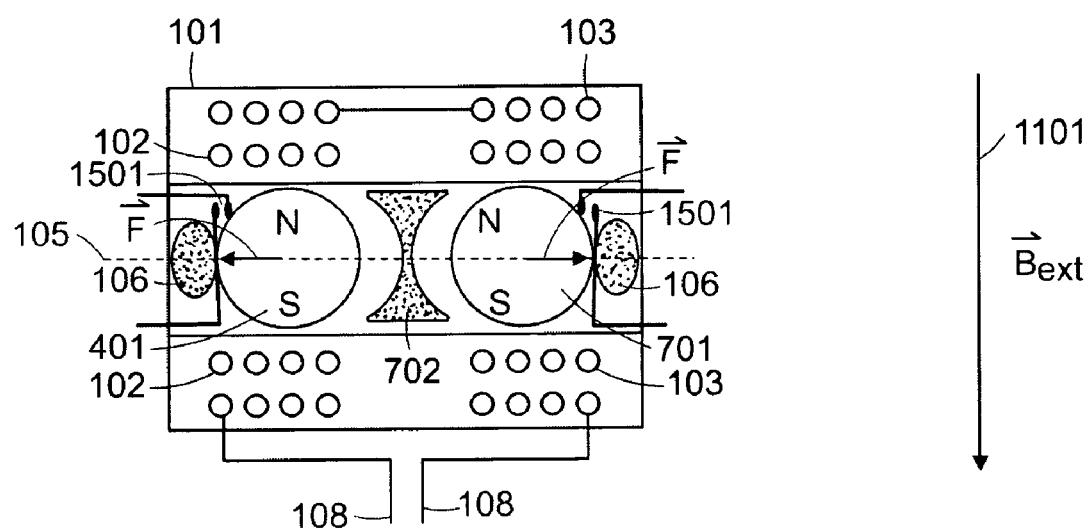
FIG. 15 schematically shows the electromagnetic transducer of FIG. 11 that additionally includes a switch that is in an open position, in accordance with one embodiment of the invention.

The situation in which both magnets 704 and 705 are repelling each other (i.e., when a strong magnetic field perpendicular to the device's axis 105 is present) may be additionally exploited for a switching function. For example, FIGS. 14 and 15 illustrate the switch shown in FIGS. 10 and 11, respectively, having electrical connections 1401 and electrical spring contacts 1402 added, in accordance with an embodiment of the invention. In the absence of any external magnetic field or in the presence of a strong magnetic field parallel to the axis of symmetry of the device, as shown in FIG. 14, the spring contacts 1402 are closed. In the event of heavily vibrating magnets, the two electrical switches may temporarily open but at any time one of the two contacts is closed. In the presence of a strong magnetic field normal to the axis of symmetry of the device, as shown in FIG. 15, both spring contacts 1402 are open because the two spherical magnets are repelling.

Further embodiments may include more than two spherical magnets. Magnets of any shape (e.g. a cube) may be embedded into a sphere or a cylinder. Parts of low mechanical friction (e.g. Teflon®) and/or low magnetic reluctance may be placed between each two magnets. Such parts may have a shape that fits optimally between two spheres and may help to further reduce the torque exerted to the embodiment. In other embodiments the spherical magnets may be coated by a layer of low friction (e.g. Teflon®) or may be immersed in a lubrication material to minimize friction. Also, ball bearings instead of low-friction gliding elements may be placed between the spherical magnets.

With regard to the above-described electromagnetic transducers for translational vibrations, the vibrations of the magnet(s) may be transferred to the housing via biasing members 106. Such designs are called "floating mass transducers." In various embodiments, the biasing members are positioned between the vibrating magnet(s) and the housing so as to prevent the magnets from directly contacting the housing. As described above, the biasing members 106 may be used to define a resonance frequency, and/or to reduce friction between the magnet(s) and the interior surface of the housing that may cause distortion. The biasing members 106 are typically flexible and resilient, and may be made of, without limitation, silicone and/or a spring-like material.

Figure 12:
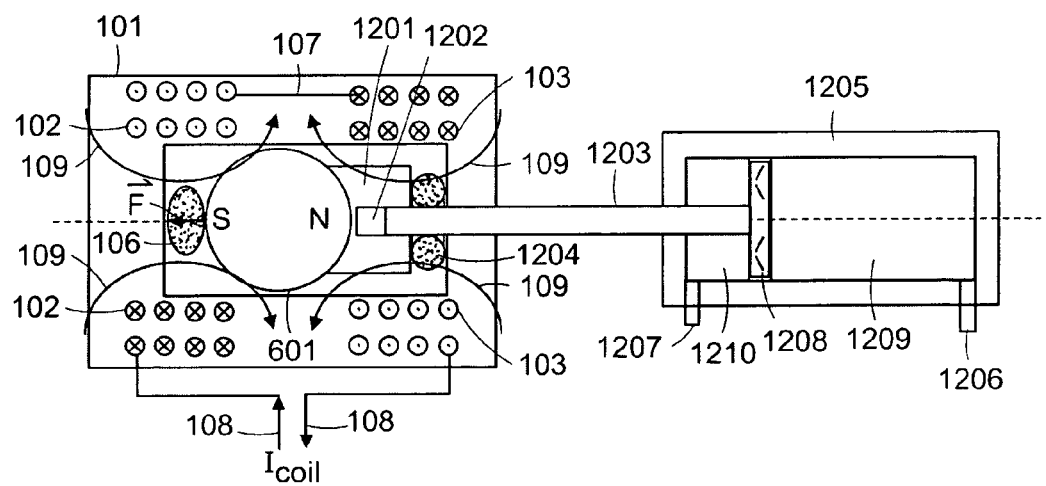
FIG. 12 schematically shows an electromagnetic transducer acting as a mechanical stimulator, the transducer including a spherical magnet, a keeper, and a shaft, in accordance with one embodiment of the invention.

The vibrating magnets in the above-described embodiments may drive shafts and/or fluids (hydraulic drivers) instead of vibrating the housing, as shown, without limitation, in FIG. 12. FIG. 12 is a modification of the embodiment shown in FIG. 6, which includes one spherical magnet 601 and a keeper 1202

Similar to FIG. 6, the keeper 1202 is held in place by a non-magnetic adapter 1201 which is connected to a shaft 1203 (note that alternatively, the non-magnetic adapter 1201 may not be needed if the keeper 1202 itself is shaped so as to maintain itself centered on the axis 105, and if the shaft 1203 is connected to keeper 1202). Due to the shaft 1203, biasing member 1204 may be shaped as a resilient torus. A current flow through the coils 102 and 103 can push can or pull the shaft (1203). The shaft 1203 may have, at one end, a piston 1208. The piston 1208 may, without limitation, separate fluid chambers 1209 and 1210 in a container (1205), the container having a fluid inlet 1206 and a fluid outlet 1207. If the piston 1208 is developed as a valve (e.g. allowing to pass fluids only from chamber 1209 to chamber 1210), vibrations of the magnet can pump a fluid, which may be a gas. Alternatively, fluctuations in fluid/gas pressure between the two chambers 1209 and 1210, which are separated by the piston, can induce voltages in the coils, such that the transducer acts as a sensor.

In accordance with another embodiment of the invention, a transducer 1300 includes a housing 1310 with a coil 1305 and a spherical magnet 1303, as shown in FIG. 13. The spherical magnet 1303 is mechanically free to turn into any direction. In the absence of any external magnetic field and when there is no current flow through the coil 1305, the spherical magnet 1303 is self-aligning (i.e. has a magnetically stable orientation) because of one or more keepers 1306 and 1307 which are fixed in the housing 1310 and which attract the magnetic poles of the sphere 1303. An alternating current flowing through the coil 1305 generates a magnetic field which exerts a torque to the spherical magnet 1303. Due to the moment of inertia, the sphere 1303 cannot respond (i.e. rotate) fast enough, and a torque in opposite direction is exerted also on the coil 1305 which is fixed relative to the housing 1310. Therefore, an alternating current flow through the coil 1305 causes a rotational vibration of the housing 1310 which may be alternatively employed instead of a translational vibrating electromagnetic transducer. This embodiment of an electromagnetic transducer (called "rotating mass transducer") is free of torque and cannot be demagnetized in the presence of a strong external magnetic field of any direction and orientation, like those occurring, without limitation, in a Magnetic Resonance Imaging (MRI) environment.

The above-described electromagnetic transducers can be used as a driver/stimulator by applying a current to said coil(s). In various embodiments, the coil(s) may be attached to leads that are attached to further circuit elements, which may include, without limitation, a processor or other control elements as known in the art. The electro-transducers may be used, for example, to improve hearing of the subject. This may include, without limitation, securing the housing of the electromagnetic transducer to an ossicle in the middle ear.

In other embodiments, the above-described electromagnetic transducers may be employed as a sensor when operated in reverse mode. For example, FIG. 9 shows the embodiment of FIG. 7 acting as a sensor. Vibrations (or, in case of the Rotating Mass Transducer, rotations) generate induction of voltages in the coil(s). Such a sensor may be used, without limitation, in auditory implants to detect the motion of the ossicles, either as a "microphone" in the middle ear or to detect the stapedius reflex.

In various embodiments of the invention, electromagnetic transducers for translational motion containing (spherical) magnets that can mechanically rotate, as described above, may be also employed as electromagnetic transducers with adjustable polarity. The mechanical response (movement direction of the magnets) to a certain current input into the coil depends on the actual orientation of the magnetic moment(s) of the magnet(s), which may be altered by applying a strong anti-parallel external magnetic field.

The above-described embodiments of electromagnetic transducers with magnets that are mechanically free to turn are free of torque during the presence of a strong external magnetic field of any orientation. A small torque may momentarily be exerted during a change of the orientation of the external magnetic field due to friction among the turning magnet(s) and also between the magnet(s) and the housing. Therefore, measures to reduce friction may be used to avoid these small amounts of torque due to friction. These measures include, without limitation, coating the magnets and/or inner surfaces of the housing with Teflon® or similar materials, or using various lubricants known in the art.

Furthermore, embodiments of electromagnetic transducers with two or more differential coils, that are winded in different orientations, can be designed, as described above in connection with FIG. 4, such that the total voltage induced in the transducer coils resulting from RF pulses is substantially zero. This can be particularly advantageous for MRI applications.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. An electro-magnetic transducer comprising:
 a housing;
 at least one coil;
 a plurality of spherical magnets within the housing, the magnets capable of turning in any direction and of movement along an axis, wherein vibration of the magnets causes vibration of the housing; and
 a switching element as a function of an orientation of an external magnetic field.

2. The electro-magnetic transducer according to claim 1, wherein the plurality of spherical magnets include a first and second magnet.

3. The electro-magnetic transducer according to claim 1, further comprising a non-magnetic adapter placed between each of the magnets, each adapter free to move along the axis.

4. The electro-magnetic transducer according to claim 3, wherein the non-magnetic adapter is one of a ball bearing and a slide bearing.

5. The electro-magnetic transducer according to claim 1, further comprising at least one biasing member positioned between the magnets and the housing, the biasing member for biasing movement of the magnets.

6. The electro-magnetic transducer according to claim 5, wherein the at least one biasing member is flexible and resilient.

7. The electro-magnetic transducer according to claim 5, wherein the at least one biasing member includes one of a spring and a silicone material.

8. The electro-magnetic transducer according to claim 5, wherein the at least one biasing member prevent the magnets from directly contacting the housing.

9. The electro-magnetic transducer according to claim 1, wherein the at least one coil includes a plurality of coils, wherein the induced voltage of the plurality of coils arising from an external RF field is zero.

10. The electro-magnetic transducer according to claim 9, wherein the at least one coil includes a first and second coil, the first coil wound in a direction opposite the second coil.

11. The electro-magnetic transducer according to claim 1, wherein the at least one coil is positioned within the housing.

12. The electro-magnetic transducer according to claim 1, wherein the at least one coil is positioned external to the housing.

13. The electro-magnetic transducer according to claim 1, wherein the transducer is substantially free of torque in the presence of an external magnetic field.

14. The electro-magnetic transducer according to claim 13, wherein the external magnetic field is caused by a Magnetic Resonance Imaging device.

15. The electro-magnetic transducer according to claim 1, wherein the housing is adapted to be fixed to an ossicle.

16. The electro-magnetic transducer according to claim 1, wherein at least one of the magnets and an inner wall of the housing are coated with a material having a low coefficient of friction.

17. The electro-magnetic transducer according to claim 16, wherein the material is Teflon.

18. The electro-magnetic transducer according to claim 1, wherein the housing is hermetically sealed.

19. The electro-magnetic transducer according to claim 1, wherein the transducer is adapted to act as a sensor.

20. The electro-magnetic transducer according to claim 19, wherein a vibration in the housing causes vibration in the magnets so as to cause a current in the at least one coil.

21. The electro-magnetic transducer according to claim 1, wherein the transducer is adapted to act as an actuator.

22. The electro-magnetic transducer according to claim 21, wherein alternating current flowing through the at least one coil causes vibration of the magnets, the vibration transferred to the housing.

23. A method of improving hearing in a subject, the method comprising:
surgically implanting a transducer in the subject, the transducer including:
a housing;
at least one coil; and
a plurality of spherical magnets within the housing, the magnets capable of turning in any direction and of movement along an axis; and
causing current to flow through the at least one coil so as to cause a vibration of the magnets, the vibration transferred to the housing.

24. The method according to claim 23, wherein said implanting includes securing said housing to an ossicle in the middle ear.

25. A method of sensing vibration in a subject, the method comprising:
surgically implanting a transducer in the subject, the transducer including:
a housing;
at least one coil; and
a plurality of spherical magnets within the housing, the magnets capable of turning in any direction and of movement along an axis; and
sensing current generated in the coil caused by vibration of the magnets.

26. The method according to claim 25, wherein said implanting includes securing said housing to an ossicle in the middle ear.

27. An electro-magnetic transducer comprising:
a housing;
at least one coil;
a plurality of spherical magnets within the housing, the magnets capable of turning in any direction and of movement along an axis, wherein vibration of the magnets causes vibration of the housing; and
a non-magnetic adapter placed between each of the magnets, the non-magnetic adapter free to move along the axis, wherein the non-magnetic adapter is one of a ball bearing and a slide bearing.

28. The electro-magnetic transducer according to claim 27, wherein the plurality of spherical magnets include a first and second magnet.

29. The electro-magnetic transducer according to claim 27, further comprising at least one biasing member positioned between the magnets and the housing, the biasing member for biasing movement of the magnets.

30. The electro-magnetic transducer according to claim 29, wherein the at least one biasing member is flexible and resilient.

31. The electro-magnetic transducer according to claim 29, wherein the at least one biasing member includes one of a spring and a silicone material.

32. The electro-magnetic transducer according to claim 29, wherein the at least one biasing member prevent the magnets from directly contacting the housing.

33. The electro-magnetic transducer according to claim 27, wherein the at least one coil includes a plurality of coils, wherein the induced voltage of the plurality of coils arising from an external RF field is zero.

34. The electro-magnetic transducer according to claim 27, wherein the at least one coil includes a first and second coil, the first coil wound in a direction opposite the second coil.

35. The electro-magnetic transducer according to claim 27, wherein the at least one coil is positioned within the housing.

36. The electro-magnetic transducer according to claim 27, wherein the at least one coil is positioned external to the housing.

37. The electro-magnetic transducer according to claim 27, wherein the transducer is substantially free of torque in the presence of an external magnetic field.

38. The electro-magnetic transducer according to claim 37, wherein the external magnetic field is caused by a Magnetic Resonance Imaging device.

39. The electro-magnetic transducer according to claim 27, wherein the housing is adapted to be fixed to an ossicle.

40. The electro-magnetic transducer according to claim 27, wherein at least one of the magnets and an inner wall of the housing are coated with a material having a low coefficient of friction.

41. The electro-magnetic transducer according to claim 40, wherein the material is Teflon.

42. The electro-magnetic transducer according to claim 27, wherein the housing is hermetically sealed.

43. The electro-magnetic transducer according to claim 27, wherein the transducer is adapted to act as a sensor.

44. The electro-magnetic transducer according to claim 43, wherein a vibration in the housing causes vibration in the magnets so as to cause a current in the at least one coil.

45. The electro-magnetic transducer according to claim 27, wherein the transducer is adapted to act as an actuator.

46. The electro-magnetic transducer according to claim 45, wherein alternating current flowing through the at least one coil causes vibration of the magnets, the vibration transferred to the housing.

47. An electro-magnetic transducer comprising:
a housing;
a plurality of coils, wherein the induced voltage of the plurality of coils arising from an external RF field is zero, and wherein the plurality of coils includes a first and second coil, the first coil wound in a direction opposite the second coil; and
a plurality of spherical magnets within the housing, the magnets capable of turning in any direction and of movement along an axis, wherein vibration of the magnets causes vibration of the housing.

48. The electro-magnetic transducer according to claim 47, wherein the plurality of spherical magnets include a first and second magnet.

49. The electro-magnetic transducer according to claim 47, further comprising at least one biasing member positioned between the magnets and the housing, the biasing member for biasing movement of the magnets.

50. The electro-magnetic transducer according to claim 49, wherein the at least one biasing member is flexible and resilient.

51. The electro-magnetic transducer according to claim 49, wherein the at least one biasing member includes one of a spring and a silicone material.

52. The electro-magnetic transducer according to claim 49, wherein the at least one biasing member prevent the magnets from directly contacting the housing.

53. The electro-magnetic transducer according to claim 47, wherein the plurality of coils are positioned within the housing.

54. The electro-magnetic transducer according to claim 47, wherein the plurality of coils are positioned external to the housing.

55. The electro-magnetic transducer according to claim 47, wherein the transducer is substantially free of torque in the presence of an external magnetic field.

56. The electro-magnetic transducer according to claim 55, wherein the external magnetic field is caused by a Magnetic Resonance Imaging device.

57. The electro-magnetic transducer according to claim 47, wherein the housing is adapted to be fixed to an ossicle.

58. The electro-magnetic transducer according to claim 47, wherein at least one of the magnets and an inner wall of the housing are coated with a material having a low coefficient of friction.

59. The electro-magnetic transducer according to claim 58, wherein the material is Teflon.

60. The electro-magnetic transducer according to claim 47, wherein the housing is hermetically sealed.

61. The electro-magnetic transducer according to claim 47, wherein the transducer is adapted to act as a sensor.

62. The electro-magnetic transducer according to claim 61, wherein a vibration in the housing causes vibration in the magnets so as to cause a current in the at least one coil.

63. The electro-magnetic transducer according to claim 47, wherein the transducer is adapted to act as an actuator.

64. The electro-magnetic transducer according to claim 63, wherein alternating current flowing through the first and second coil causes vibration of the magnets, the vibration transferred to the housing.

65. An electro-magnetic transducer comprising:
a housing;
at least one coil; and
a plurality of spherical magnets within the housing, the magnets capable of turning in any direction and of movement along an axis, wherein vibration of the magnets causes vibration of the housing, wherein at least one of the magnets and an inner wall of the housing are coated with a material having a low coefficient of friction, wherein the material is Teflon.

66. The electro-magnetic transducer according to claim 65, wherein the plurality of spherical magnets include a first and second magnet.

67. The electro-magnetic transducer according to claim 65, further comprising at least one biasing member positioned between the magnets and the housing, the biasing member for biasing movement of the magnets.

68. The electro-magnetic transducer according to claim 67, wherein the at least one biasing member is flexible and resilient.

69. The electro-magnetic transducer according to claim 67, wherein the at least one biasing member includes one of a spring and a silicone material.

70. The electro-magnetic transducer according to claim 67, wherein the at least one biasing member prevent the magnets from directly contacting the housing.

71. The electro-magnetic transducer according to claim 65, wherein the at least one coil includes a plurality of coils, wherein the induced voltage of the plurality of coils arising from an external RE field is zero.

72. The electro-magnetic transducer according to claim 65, wherein the at least one coil is positioned within the housing.

73. The electro-magnetic transducer according to claim 65, wherein the at least one coil is positioned external to the housing.

74. The electro-magnetic transducer according to claim 65, wherein the transducer is substantially free of torque in the presence of an external magnetic field.

75. The electro-magnetic transducer according to claim 74, wherein the external magnetic field is caused by a Magnetic Resonance Imaging device.

76. The electro-magnetic transducer according to claim 65, wherein the housing is adapted to be fixed to an ossicle.

77. The electro-magnetic transducer according to claim 65, wherein the housing is hermetically sealed.

78. The electro-magnetic transducer according to claim 65, wherein the transducer is adapted to act as a sensor.

79. The electro-magnetic transducer according to claim 78, wherein a vibration in the housing causes vibration in the magnets so as to cause a current in the at least one coil.

80. The electro-magnetic transducer according to claim 65, wherein the transducer is adapted to act as an actuator.

81. The electro-magnetic transducer according to claim 80, wherein alternating current flowing through the first and second coil causes vibration of the magnets, the vibration transferred to the housing.

* * * * *